(12) United States Patent
Seiting et al.

(10) Patent No.: US 10,543,761 B2
(45) Date of Patent: Jan. 28, 2020

(54) AIR SUPPLY COMPONENT FOR USE WITH A SEAT

(71) Applicant: FAURECIA AUTOMOTIVE SEATING, LLC, Auburn Hills, MI (US)

(72) Inventors: Todd Seiting, Clarkston, MI (US); John Perraut, Rochester Hills, MI (US); Hugo Bricout, Southfield, MI (US)

(73) Assignee: FAURECIA AUTOMOTIVE SEATING, LLC, Auburn Hills, MI (US)

( * ) Notice: Subject to any disclaimer, the term of this patent is extended or adjusted under 35 U.S.C. 154(b) by 142 days.

(21) Appl. No.: 15/033,638

(22) PCT Filed: Oct. 31, 2014

(86) PCT No.: PCT/US2014/063436
§ 371 (c)(1),
(2) Date: Apr. 30, 2016

(87) PCT Pub. No.: WO2015/066477
PCT Pub. Date: May 7, 2015

(65) Prior Publication Data
US 2016/0250956 A1 Sep. 1, 2016

Related U.S. Application Data

(60) Provisional application No. 61/898,070, filed on Oct. 31, 2013.

(51) Int. Cl.
*B60N 2/56* (2006.01)
(52) U.S. Cl.
CPC .................. *B60N 2/5657* (2013.01)

(58) Field of Classification Search
CPC ..... B60N 2/5657; B60N 2/5671; B60N 2/879
See application file for complete search history.

(56) References Cited

U.S. PATENT DOCUMENTS 5,102,189 A * 4/1992 Saito .................... B60N 2/5635
261/DIG. 88
5,450,894 A * 9/1995 Inoue .................. B60H 1/00285
165/43

(Continued)

FOREIGN PATENT DOCUMENTS

JP 2006137362 A * 6/2006
JP 2006137362 A 6/2006

(Continued)

OTHER PUBLICATIONS

JP 2011063050 Machine Translation (Year: 2011).*

(Continued)

*Primary Examiner* — James M Ference
(74) *Attorney, Agent, or Firm* — Reising Ethington P.C.

(57) ABSTRACT

A seat includes an air discharge port configured to provide a thin stream of conditioned air along a body surface of a seat occupant. The air discharge port is part of an air supply component located in or along the seat bottom or backrest. The air discharge port is positioned to direct conditioned air along an external surface of the air supply component or of another surface of the seat to form an initial thin stream of conditioned air that follows external seat surfaces to reach and flow along the seat occupant. The air supply component can be made adjustable to allow the location and/or direction of the discharged air to be changed to accommodate and maintain the conditioned air in a thin stream.

10 Claims, 6 Drawing Sheets

(56) References Cited

U.S. PATENT DOCUMENTS

| | | | | |
|---|---|---|---|---|
| 5,924,766 A * | 7/1999 | Esaki | A47C 7/74 | 297/180.13 |
| 6,059,018 A * | 5/2000 | Yoshinori | B60H 1/00285 | 165/41 |
| 6,644,735 B2 * | 11/2003 | Bargheer | B60H 1/00285 | 297/180.13 |
| 6,793,016 B2 * | 9/2004 | Aoki | B60H 1/00285 | 165/202 |
| 7,478,869 B2 * | 1/2009 | Lazanja | B60N 2/5635 | 297/180.13 |
| 7,581,584 B2 * | 9/2009 | Yoneno | A47C 7/744 | 165/202 |
| 7,581,785 B2 * | 9/2009 | Heckmann | B60H 1/00407 | 297/180.12 |
| 7,621,594 B2 * | 11/2009 | Hartmann | B60H 1/00821 | 219/217 |
| 7,873,451 B2 * | 1/2011 | Hartmann | B60H 1/2218 | 454/120 |
| 2002/0041116 A1 * | 4/2002 | Bogisch | B60J 7/223 | 297/180.1 |
| 2002/0057006 A1 * | 5/2002 | Bargheer | B60H 1/00285 | 297/180.14 |
| 2003/0132650 A1 * | 7/2003 | Bargheer | B60N 2/5628 | 297/180.13 |
| 2004/0053571 A1 * | 3/2004 | Aoki | A61L 9/16 | 454/159 |
| 2005/0264047 A1 * | 12/2005 | Bauer | A47C 7/74 | 297/180.13 |
| 2005/0268621 A1 * | 12/2005 | Kadle | B60H 1/00285 | 62/3.2 |
| 2006/0032265 A1 * | 2/2006 | Shaw | B60N 2/5621 | 62/420 |
| 2006/0105698 A1 * | 5/2006 | Butera | B60H 1/00742 | 454/256 |
| 2006/0175877 A1 * | 8/2006 | Alionte | A47C 7/74 | 297/180.14 |
| 2006/0261645 A1 * | 11/2006 | Bargheer | B60H 1/3407 | 297/180.14 |
| 2006/0273646 A1 * | 12/2006 | Comiskey | A47C 7/74 | 297/408 |
| 2007/0214800 A1 * | 9/2007 | Kadle | B60N 2/5635 | 62/3.3 |
| 2007/0234742 A1 * | 10/2007 | Aoki | B60H 1/00285 | 62/3.3 |
| 2007/0278835 A1 * | 12/2007 | Bargheer | A47C 7/38 | 297/180.12 |
| 2008/0012398 A1 * | 1/2008 | Alacqua | B60N 2/5628 | 297/180.1 |
| 2008/0122275 A1 * | 5/2008 | Flory | B60N 2/5635 | 297/230.1 |
| 2008/0136240 A1 * | 6/2008 | Matthews | B60N 2/4235 | 297/354.1 |
| 2008/0168787 A1 * | 7/2008 | Kameyama | B60H 1/00285 | 62/244 |
| 2008/0290703 A1 * | 11/2008 | Bargheer | B60N 2/5621 | 297/180.14 |
| 2008/0315634 A1 * | 12/2008 | Hartmann | B60N 2/5635 | 297/180.14 |
| 2009/0031742 A1 * | 2/2009 | Seo | B60N 2/5628 | 62/244 |
| 2009/0134677 A1 * | 5/2009 | Maly | B60N 2/5635 | 297/180.14 |
| 2009/0140558 A1 * | 6/2009 | Fallen | B60N 2/5621 | 297/180.1 |
| 2009/0295200 A1 * | 12/2009 | Ito | B60N 2/809 | 297/180.14 |
| 2010/0038937 A1 * | 2/2010 | Andersson | B60N 2/5635 | 297/180.14 |
| 2010/0300644 A1 * | 12/2010 | Chung | B60N 2/5635 | 165/41 |
| 2010/0314071 A1 * | 12/2010 | Lee | B60H 1/00285 | 165/59 |
| 2011/0115263 A1 * | 5/2011 | Bargheer | B60H 1/00407 | 297/180.13 |
| 2011/0187165 A1 * | 8/2011 | Oota | B60N 2/5671 | 297/180.14 |
| 2011/0226461 A1 * | 9/2011 | Fujii | B60H 1/00285 | 165/200 |
| 2011/0227389 A1 * | 9/2011 | Gomes | B60N 2/5635 | 297/452.43 |
| 2012/0013153 A1 * | 1/2012 | Chang | B60N 2/5635 | 297/180.1 |
| 2013/0165033 A1 * | 6/2013 | Fitzpatrick | B60H 1/00285 | 454/120 |
| 2014/0179212 A1 * | 6/2014 | Space | B60N 2/565 | 454/76 |
| 2016/0009206 A1 * | 1/2016 | Perraut | B60N 2/5635 | 297/180.12 |
| 2016/0250956 A1 * | 9/2016 | Seiting | B60N 2/5671 | 297/180.14 |

FOREIGN PATENT DOCUMENTS

| | | |
|---|---|---|
| JP | 2007176238 A | 7/2007 |
| JP | 2011031859 A | 2/2011 |
| JP | 2011063050 A | 3/2011 |

OTHER PUBLICATIONS

JP 2006-137362 Machine Translation (Year: 2019).*
International Search Report corresponding to International application No. PCT/US2014/063436, dated Feb. 2, 2016, 3 pages.
Written Opinion corresponding to International application No. PCT/US2014/063436, dated Feb. 2, 2016, 9 pages.

* cited by examiner

AIR SUPPLY COMPONENT FOR USE WITH A SEAT

TECHNICAL FIELD

The present disclosure relates to climate control systems and components and, more particularly, to climate control in the vicinity of the occupant of a seat.

BACKGROUND

Vehicle climate control systems typically consume more energy than any other non-drivetrain system in modern vehicles. This is due to the need to defrost and/or to defog the windshield to maintain safe operation of the vehicle. It is also due to the desire to heat or to extract heat from the passenger cabin as quickly as possible to minimize the amount of time passengers are subjected to the discomfort of extreme cabin temperatures.

Most vehicle climate control systems rely primarily on blowing large volumes of conditioned air, i.e. heated and/or cooled air, into the passenger cabin until the overall cabin temperature is sufficiently comfortable for the passengers. The conditioned air is usually blown into the passenger cabin through vents located in and/or around the instrument panel or dashboard at the front of the vehicle.

Some vehicle climate control systems that include additional duct work routed throughout the vehicle have been proposed to more evenly distribute the conditioned air to second or third passenger seating rows, where the intended effect is generally to change the overall cabin temperature in a more uniform manner with little or no regard for energy consumption.

German patent publication DE 10 2008 052 019 A1 by Daimler AG discloses a vehicle seat with an air supply vent located on the seat back so that heated air can be blown on the back of a seat occupant's neck. The vent is installed in the seat at a fixed location and provides only heated air, useful to provide warmth to the seat occupant's neck for comfort, particularly in open-cabin vehicles such as convertibles.

SUMMARY

In accordance with one or more embodiments, an air supply component adapted for attachment to a seat includes an airflow conduit adapted for fluid communication with a positive pressure air source and an air discharge port in fluid communication with the airflow conduit. The air discharge port is configured to be moveable to change the location and/or direction of airflow from the air supply component when attached to the seat.

In one or more embodiments, the airflow conduit is constructed to extend transversely away from a center of the seat when attached to the seat, and the air discharge port is spaced transversely away from the center of the seat.

In one or more embodiments, a central air discharge port is in fluid communication with the airflow conduit and configured to discharge the air.

In one or more embodiments, the air supply component includes a second air discharge port, and the airflow conduit is constructed to extend transversely between first and second ends along an upper portion of the seat when attached to the seat. One air discharge port is located at the first end of the airflow conduit, and the second discharge port is located at the second end of the airflow conduit.

In one or more embodiments, the air supply component includes an adjustment portion moveably coupled with the airflow conduit and in fluid communication with the airflow conduit. The air discharge port is formed in the adjustment portion so that movement of the adjustment portion changes the direction of airflow from the air supply component between upward and downward directions, between opposite side-to-side directions, or both.

In one or more embodiments, the air supply component is adapted for attachment to an adjustable headrest of the seat so that the air supply component moves together with the adjustable headrest.

In one or more embodiments, the air supply component includes a front edge and an external surface, and the air discharge port is located away from the front edge and is configured to direct airflow over the external surface.

In one or more embodiments, an external surface of the air supply component has a curvature that changes the direction of the airflow from the direction of initial discharge from the air discharge port.

In one or more embodiments, the air discharge port comprises an elongated slot that discharges a thin stream of air over an external surface of the air supply component.

In one or more embodiments, a seat includes the air supply component and further includes a seat bottom and a backrest coupled with the seat bottom and extending away from the seat bottom to an upper portion. The air supply component is attached to the upper portion of the seat and located so that airflow from the air supply component can be directed along the shoulders and/or the neck of a seat occupant.

In one or more embodiments, the seat is a vehicle seat including a base supporting the seat bottom, the base being adapted for attachment to a vehicle body.

In one or more embodiments, a thermal comfort system comprises the seat, a positive pressure air source in fluid communication with the air discharge port, a heat exchanger located and arranged to heat and/or cool the air from the positive pressure air source, and a controller adapted to receive user input and to control one or more characteristics of the airflow from the air supply component in response to the user input.

In accordance with another embodiment, a seat includes an air discharge port configured to provide a thin stream of conditioned air along a body surface of a seat occupant such that the thin stream of conditioned air follows the contour of the body surface of the seat occupant.

In one or more embodiments, the seat includes an air supply component comprising the air discharge port. The air supply component is adjustable to change the location and/or direction of airflow from the air supply component in order to provide the thin stream of conditioned air along corresponding body surfaces of different-sized seat occupants.

In one or more embodiments, the seat includes an external surface, and the air discharge port is configured to discharge conditioned air along the external surface to form a initial thin stream of conditioned air that follows the contour of the external surface from the air discharge port and toward the seat occupant.

In one or more embodiments, the external surface of the seat includes an external surface of the air supply component.

In one or more embodiments, the external surface of the seat includes an external surface of a seat covering.

In one or more embodiments, the seat includes a seat bottom and a backrest coupled with the seat bottom and extending away from the seat bottom to an upper portion. The air discharge port is located along a front portion or a side portion of the seat bottom or along an upper portion or a side portion of the backrest.

In one or more embodiments, the conditioned air exits the seat and follows the contour of an external surface of the seat to direct the air toward the body surface of the seat occupant.

In one or more embodiments, the air discharge port is configured to discharge an initial thin stream of conditioned air in an initial direction that is not toward the seat occupant.

Within the scope of this disclosure it is envisaged that the various aspects, embodiments, examples, features and alternatives set out in the preceding paragraphs, in the claims and/or in the following description and drawings may be taken independently or in any combination thereof. For example, features disclosed in connection with one embodiment are applicable to all embodiments, except where there is incompatibility of features.

DESCRIPTION OF THE ILLUSTRATED EMBODIMENTS

The present disclosure relates to an air supply component described below which can be attached to or integrated into a seat, such as a vehicle seat, to provide a thin stream of conditioned air along the body of a seat occupant. This new approach to seat occupant thermal comfort takes advantage of the tendency for a jet or stream of fluid directed along a solid surface to be attracted to and to follow the contour of the surface as a thin layer.

This so-called Coandă effect, when implemented with the seat in the manner described below, can be used to direct the air due to its attraction to a surface rather than by relying solely on directing air by pushing using hard surfaces. The result can provide the seat occupant with thermal comfort in less time and with less energy consumption than traditional climate control systems (HVAC systems). This allows non-traditional surfaces to be used to direct the air, such as a surface of an air supply component, the human body itself, and/or soft or hard surfaces of the seat, such as the sides of the seat. This is particularly the case in a cooling mode system, where the velocity of the airflow moving along the body surface of the seat occupant has a significant effect on how quickly the seat occupant experiences a cooling sensation.

Further, this quick-comfort effect can be achieved without the need to thermally condition the entire vehicle cabin, without the large volume of air displacement required by traditional climate control systems, and without other uncomfortable effects associated with large-volume air displacement (e.g., noise, dry eyes, hair and clothing movement, etc.).

Figure 1:
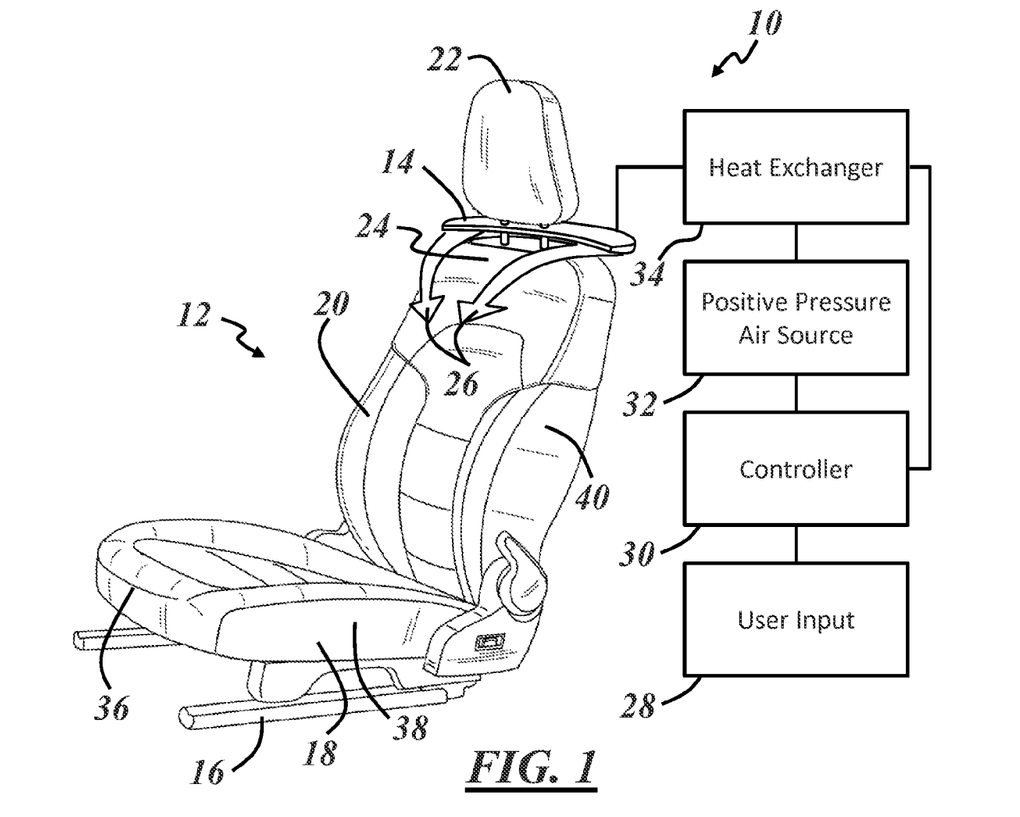
FIG. 1 is a combined perspective and schematic view of an example of a thermal comfort system including a vehicle seat equipped with an air supply component.

FIG. 1 is a combined perspective and schematic view of one example of a thermal comfort system 10, in the form of a seat occupant thermal comfort system, including a seat 12 equipped with an air supply component 14. The illustrated seat 12 is a vehicle seat that also includes a base 16 adapted for attachment to a vehicle frame or floor, a seat bottom 18 supported by the base 16 and a backrest 20 coupled with and extending up from the seat bottom 18. The seat 12 may also include a headrest 22, as shown, and may be coupled with the backrest 20 at an upper portion 24 of the backrest 20.

The air supply component 14 in this example is located along the upper portion 24 of the backrest 20, above the backrest and between the backrest 20 and the headrest 22. The air supply component 14 includes one or more air discharge ports 42 (not shown in FIG. 1) configured to provide a thin stream of conditioned air 26 along a body surface S of a seat occupant, such that the thin stream of conditioned air 26 follows the contour of the body surface S of the seat occupant.

Because the shape, size, and seating posture of seat occupants can vary, the air discharge port 42 is moveable to accommodate changing the location and/or the direction of the airflow from the air supply component 14.

The entire air supply component 14 may be moveable and/or one or more individual portions of the air supply component 14 may be moveable to direct the airflow to a location and/or in a direction with respect to the seat occupant, so that the thin stream of conditioned air 26 follows the contour of the seat occupant's body rather than directly impacting the seat occupant or missing the seat occupant's body entirely. Air discharge port movement and adjustment is described in greater detail below in conjunction with additional figures.

As shown in FIG. 1, the thermal comfort system 10 may further include a user input 28, a controller 30, a positive pressure air source 32, and a heat exchanger 34.

The user input 28 is any device or combination of devices that the user interacts with to communicate a desire to change the thermal environment around the seat occupant. Some non-limiting examples of suitable user inputs 28 include switches, buttons, touch screens, microphones, or motion sensors. More than one user input 28 may be included, and the user can be someone other than the seat occupant.

The controller 30 receives information from the user input 28 and uses the received information to control the operation of other components of the thermal comfort system 10, such as the positive pressure air source 32 and the heat exchanger 34 in the example of FIG. 1. The controller 30 can be a dedicated controller for the thermal comfort system 10, or it may be a controller, such as a vehicle control module, that also controls other non-comfort system components. The controller 30 may also be configured to receive information from additional systems or vehicle components and/or to control the operation of other system components not illustrated in FIG. 1. Multiple controllers 30 may be implemented as part of the thermal comfort system 10, or the controller 30 may be omitted entirely. For instance, the user input 28 may be a switch that directly powers the positive pressure air source 32 on or off with no controller 30.

The positive pressure air source 32 is a source of air above ambient atmospheric pressure or vehicle cabin pressure and may be the output side of a blower (e.g. an electric blower) or any other suitable fluid pump. The positive pressure air source 32 is in fluid communication with the air supply component 14 in this example and provides a pressure differential with respect to the seat environment necessary to cause air to flow out of the air discharge port(s) 42 to form the thin streams of conditioned air 26. The positive pressure air source 32 can be located in or on the seat 12 or elsewhere.

In one example, the seat 12 includes an internal and independently powered electric blower as the positive pressure air source 32. In another example, the positive pressure air source 32 is the main blower of a vehicle climate control system (HVAC system). Internal seat cavities or other ductwork may also be considered to be the positive pressure air source 32, whether pressurized by a local or remote blower.

The heat exchanger 34 is operable to affect the temperature of the air discharged from the air supply component 14 and is located within the thermal comfort system 10 to be in contact with air flowing into, within, or out of the thermal comfort system 10. The heat exchanger 34 may include a heating element, a cooling element or a succession of a heating and cooling elements, such as an electric resistive element, a fluid conduit carrying heated or cooled fluid, or a thermoelectric device (TED) that air flows along to become the conditioned air to flow out of the air discharge port(s) 42 to form the thin streams of conditioned air 26. The heat exchanger 34 extracts heat from or transfers heat to air within the thermal comfort system 10.

The heat exchanger 34 may be located downstream, upstream or at the positive pressure air source 32. In one example, the heat exchanger 34 is located between the positive pressure air source 32 and the air supply component 14. The heat exchanger 34 may also be located at a negative pressure or air intake side of the positive pressure air source 32. The heat exchanger 34 may be shared with the vehicle HVAC system in some cases, and the thermal comfort system 10 may include both heating- and cooling-type heat exchangers.

The seat occupant thermal comfort system 10 depicted in FIG. 1 is merely illustrative, and several variations are possible. While described here in conjunction with a vehicle seat, this disclosure is applicable to any type of seat where it is desired to provide thermal comfort to a seat occupant or to exercise control over the thermal comfort of the seat occupant.

The illustrated vehicle seat 12 can be located anywhere in the vehicle (e.g. front, middle, or rear seating row), and the thermal comfort system 10 may be configured to mix heated and/or cooled air or to provide heated air along one body surface and cooled air along a different body surface of the seat occupant.

In addition, air discharge ports 42 configured to provide thin streams of conditioned air 26 may be located elsewhere along the seat 12, such as along a front portion 36 or a side portion 38 of the seat bottom 18, along a side portion 40 of the backrest 20, or along a side portion of the headrest 22. The air discharge port(s) 42 can also be integrated or built into the seat 12 rather than being provided as part of the separately attached air supply component 14 illustrated in FIG. 1.

The thin streams of conditioned air 26 illustrated in FIG. 1 originate at the air supply component 14 and are directed generally in a frontward direction toward the shoulder and/or neck area of the seat occupant. A downward path followed by the thin streams of conditioned air 26 is due at least in part to the airflow being attracted to and following the contour of the body surface S of the seat occupant—in this case, the tops of the shoulders of the seat occupant. The thin stream(s) of conditioned air 26 from the air supply component 14 is directed toward the seat occupant so that it contacts the desired body surface S at a very low angle of incidence, such as parallel with or tangent to the desired body surface S.

Figure 2:
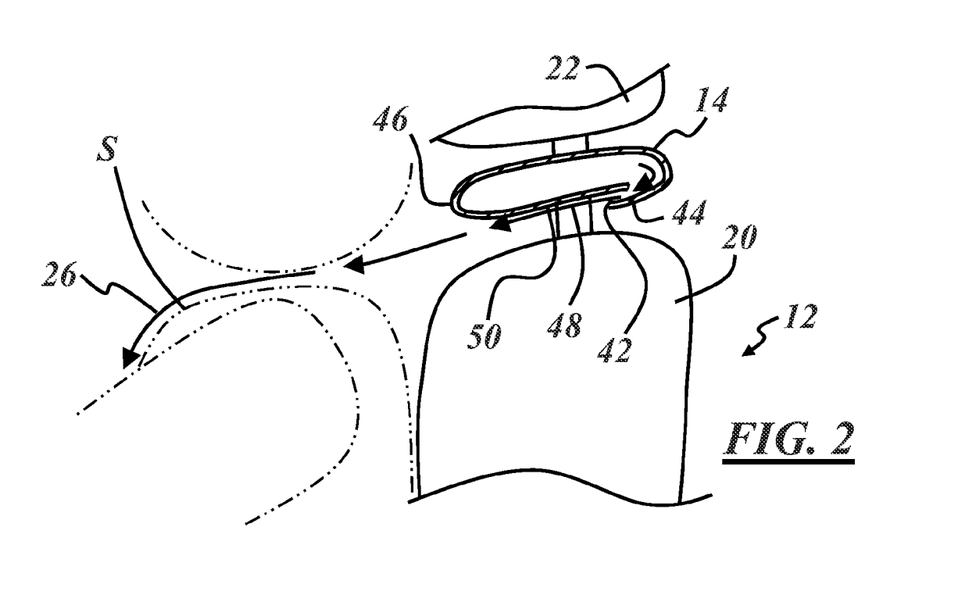
FIG. 2 is a side view of a portion of the seat of FIG. 1, illustrating an air discharge port in a cross-sectional view of the air supply component.

FIG. 2 is a partial side view of the vehicle seat 12 of FIG. 1, with the air supply component 14 shown in cross-section and the seat occupant shown in phantom view. The air discharge port 42 is also shown in FIG. 2 and, in this case, is located on a rear bottom side 44 of the air supply component 14 and away from a front edge 46 of the air supply component 14. Alternatively, the air discharge port 42 may be located on a rear top side of the air supply component 14 and away from a front edge 46 of the air supply component 14. In other examples, the air discharge port is located between the front and rear of the air supply component either on top or bottom.

In the illustrated configuration, conditioned air is discharged from the air discharge port 42, and an initial thin stream of conditioned air 48 is formed. The initial thin stream of conditioned air 48 flows along and follows the contour of an external surface 50 of the air supply component 14 and toward the seat occupant. Forming the discharged air into the initial thin stream of conditioned air 48 at the air supply component 14 before it flows away from the air supply component 14 toward the seat occupant allows the conditioned air to be more accurately directed away from the air supply component 14 than the turbulent air that is typically blown out of traditional vehicle HVAC vents.

As shown in FIG. 2, the above-described Coandă effect is present along more than one surface, including the external surface 50 of the air supply component 14 and the body surface S of the seat occupant.

The external surface 50 of the air supply component 14 may be flat or curved along the direction of the airflow, and a profile of the external surface 50 of the air supply component 14 may be shaped as desired to maintain or to change the direction of the airflow from its initial direction of discharge from the air discharge port 42. For instance, depending on the vertical location or position of the air supply component 14, a front portion of the external surface 50 may have an upward or downward curvature to better direct the airflow toward the desired body surface S. In one embodiment, the external surface 50 has an airfoil profile similar to that of a turbine or impeller blade.

Figure 3:
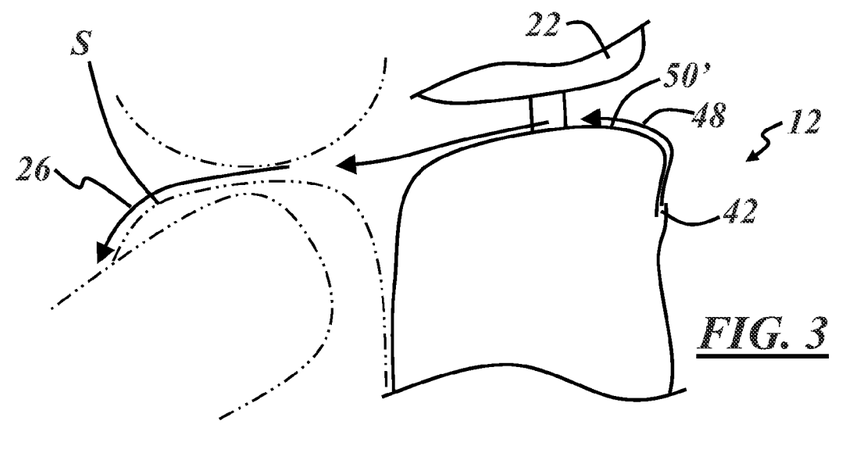
FIG. 3 is a side view of an example of a vehicle seat with the air discharge port located along a rear side of a backrest of the seat.

In some embodiments, such as that illustrated in FIG. 3, an external surface 50' along which the initial thin stream of conditioned air 48 is formed is an external seating surface provided, for example, by a decorative seat covering. FIG. 3 schematically illustrates an example in which the air discharge port 42 is integrated with the seat 12 in a relatively inconspicuous manner. FIG. 3 also illustrates how directing discharged air along the external surface 50' so that it follows the shape of the external surface 50' can allow the air discharge port 42 to be located away from the location at which the conditioned air flows away from the seat 12. In this instance, the air discharge port 42 is located on the back side of the seat 12 to direct the conditioned air away from the back side of the seat, for example.

Figure 4:
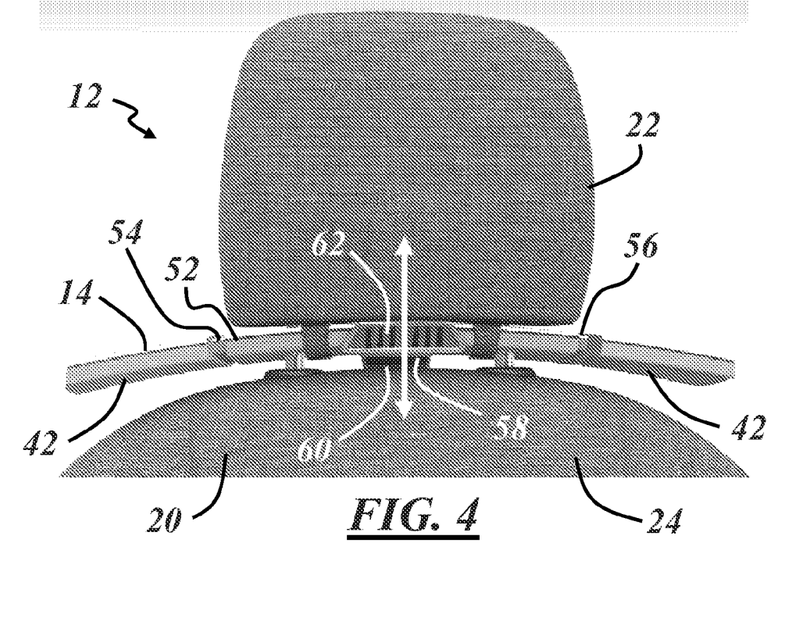
FIG. 4 is a front view of a portion of a vehicle seat, where the air supply component is configured to move with an adjustable headrest.
Figure 5:
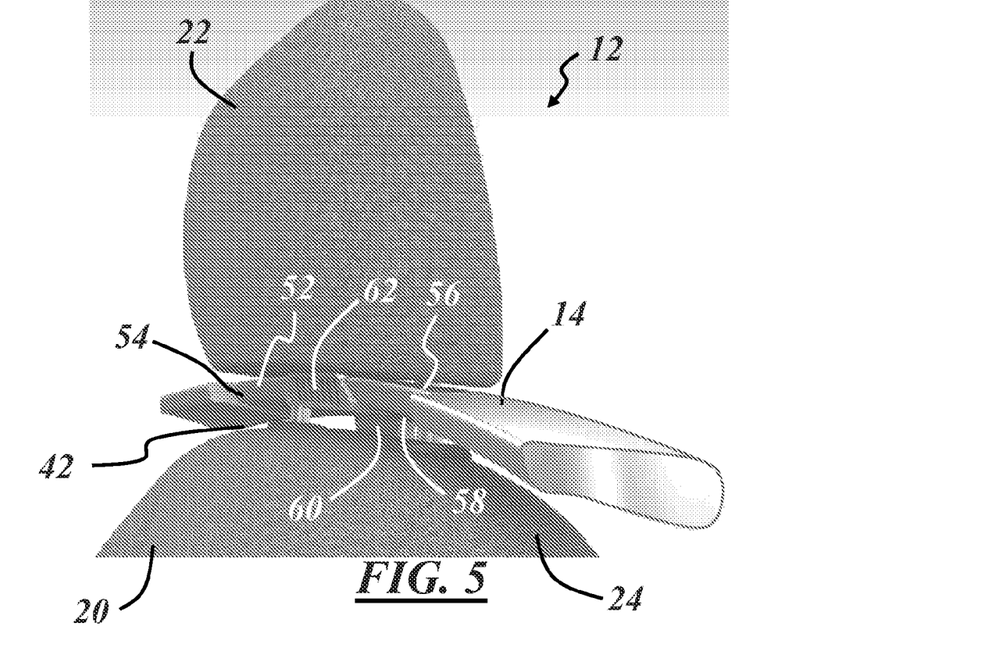
FIG. 5 is a front and side perspective view of the vehicle seat of FIG. 4.
Figure 6:
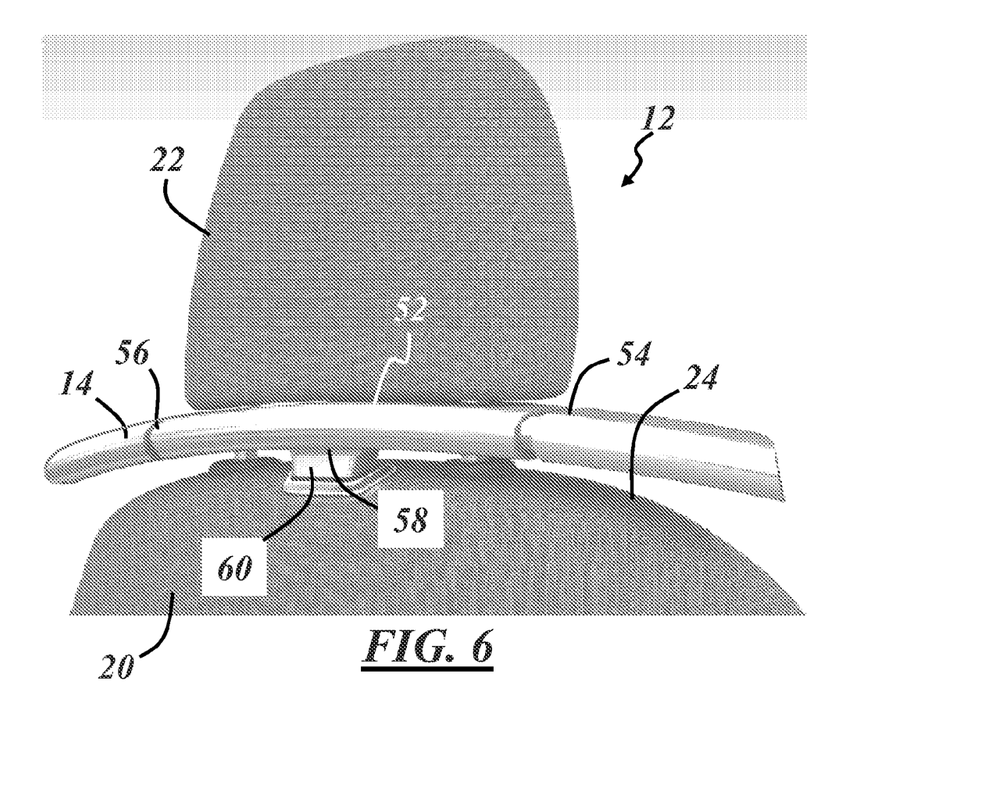
FIG. 6 is a rear perspective view of the vehicle seat of FIGS. 4 and 5.

FIGS. 4-6 illustrate various views of one particular embodiment of the air supply component 14. FIG. 4 is a front view of the upper portion 24 of the vehicle seat 12, showing the air supply component 14, advantageously attached to the headrest 22, and FIGS. 5 and 6 are respective front and rear perspective views of the portion of the vehicle seat 12 illustrated in FIG. 4.

The illustrated headrest 22 is vertically adjustable between upward and downward positions, and the air supply component 14 moves with the headrest 22.

The air supply component 14 includes an airflow conduit 52, adapted for fluid communication with the above-described positive pressure air source 32, and one or more air discharge ports 42 in fluid communication with the airflow conduit 52. In this example, the airflow conduit 52 is an elongated hollow body that extends transversely between first and second ends 54, 56, and one air discharge port 42 is located at each of the first and second ends 54, 56.

The airflow conduit 52 is in fluid communication with each of the air discharge ports 42 and with an air intake port 58. The air intake port 58 is adapted for fluid communication with the positive pressure air source. In this example, a portion 60 of the air supply component 14 extends downward into the upper portion 24 of the backrest 20 to be coupled with the positive pressure air source 32. This coupling may be a telescoping coupling or may include flexible tubing to accommodate the vertical adjustment of the headrest 22. Each air discharge port 42 is thus vertically moveable with respect to the backrest 20 to change the location of the airflow.

The illustrated air supply component 14 is constructed to extend transversely away from the center of the seat 12 toward the first and second ends 54, 56 so that each air discharge port 42 is spaced transversely away from the center of the seat 12. The particular embodiment in FIGS. 4-6 also includes a central air discharge port 62, useful for providing airflow from the air supply component 14 at or near the neck of the seat occupant. The air supply component 14 may include an air diffuser at the central air discharge port 62 so that air discharged therefrom is delivered to the seat occupant at low velocity. The central air discharge port 62 may be provided in any suitable form, such as a grill or grate with small openings, or reticulated foam or spacer fabric through which the air flows. The air supply component 14 may also include inner walls or baffles to distribute airflow to the various air discharge ports 42, 62 in the desired proportions.

It has been found that certain characteristics of the airflow from the air supply component 14 have different comforting or discomforting effects on the seat occupant, depending on whether the seat occupant desires a warming sensation or a cooling sensation. As noted above, increased velocity of the thin stream of conditioned air 26 is a significant factor in cooling comfort. But when the seat occupant desires a warming sensation, high velocity air is not comforting to the seat occupant. Additionally, high velocity air aimed directly at the seat occupant is undesirable, whether heated or cooled.

While some seat occupants experience momentary relief in a hot vehicle cabin when high velocity cooled air is aimed directly at the face or body, the relief is short-lived, and most seat occupants find high velocity air directly impacting the body to be uncomfortable after a short period.

The air supply component 14 illustrated in FIGS. 4-6, including the central air discharge port 62 and associated air diffuser, is useful to provide heated and/or cooled air to the seat occupant in a manner that maximizes comforting sensations particular to the desired effect (hot and/or cold) while also minimizing or eliminating sensations that cause discomfort.

In a cooling mode, cooled air is provided as the thin stream of conditioned air 26 along the body surface S of the seat occupant and, in a heating mode, heated air is provided as diffuse, low velocity air aimed directly toward the seat occupant.

The air supply component 14 may include isolated heated air and cooled air flow paths, or the thermal comfort system 10 may be configured to switch between or to mix heated and/or cooled air as necessary.

The air supply component 14 and the associated thermal comfort system 10 can provide these advantages while also eliminating or reducing the need for the high volumetric flow blowers typical of vehicle HVAC systems.

Figure 7:
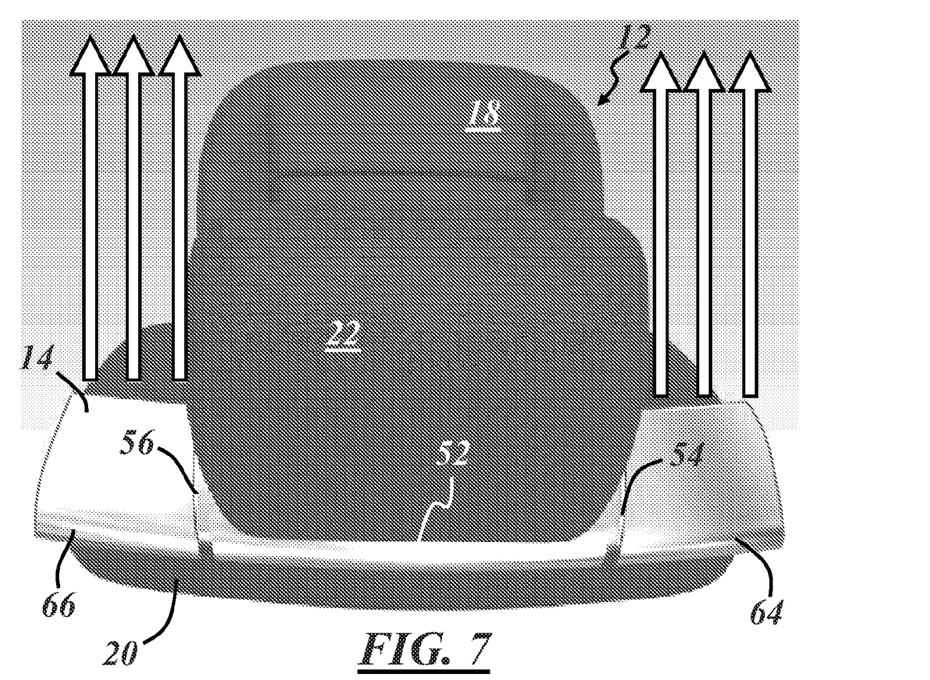
FIG. 7 is a top view of the vehicle seat of FIGS. 4-6.
Figure 8:
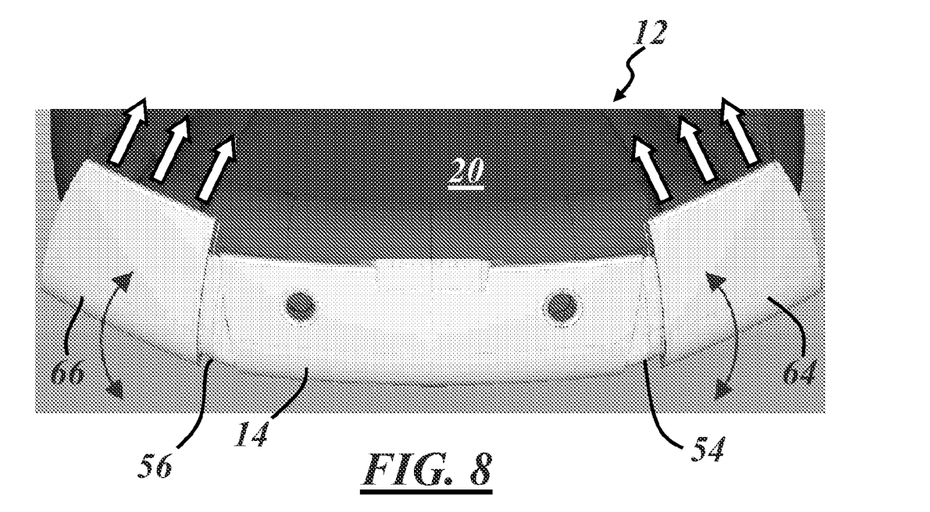
FIG. 8 is a portion of FIG. 7 with the headrest omitted, illustrating operation of adjustment portions of the air supply component.
Figure 9:
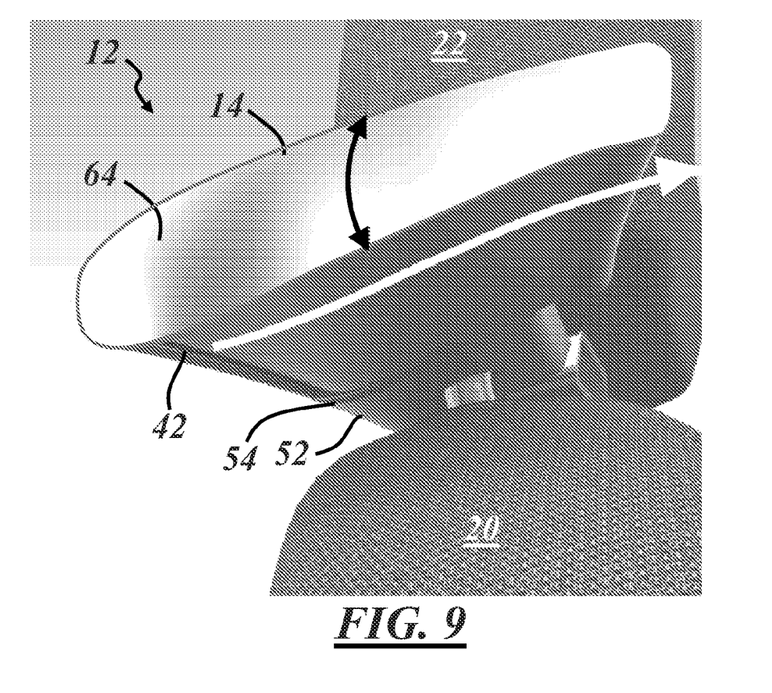
FIG. 9 is a perspective view of the vehicle seat of FIGS. 4-8, illustrating a bottom side of the air supply component.

FIGS. 7-9 illustrate various additional views of the air supply component 14 and seat 12 of FIGS. 4-6 illustrating other movements or adjustments that are possible. The illustrated air supply component 14 includes first and second adjustment portions 64, 66 at respective first and second ends 54, 56 of the airflow conduit 52. Each of the adjustment portions 64, 66 is moveably coupled with the airflow conduit 52 and in fluid communication with the airflow conduit 52. Each of the two air discharge ports 42 (not visible in FIGS. 7 and 8) is formed in one of the adjustment portions 64, 66 so that movement of the adjustment portions 64, 66 changes the direction of airflow from the air supply component 14.

As shown in the top views of the seat 12 in FIG. 7 and FIG. 8 (in which the headrest 22 is omitted), each of the adjustment portions 64, 66 is configured to rotate about a generally vertical axis (i.e., in-line with the backrest) and between opposite side-to-side directions.

In FIG. 7, the adjustment portions 64, 66 are oriented to direct airflow from the air supply component 14 in a straight, frontward direction, useful for providing the thin stream of conditioned air 26 along the surface of the arms of the seat occupant or over the shoulders and along the upper torso of relatively wide or broad-shouldered seat occupants. In FIG. 8, the adjustment portions 64, 66 are rotated inward toward the center of the seat 12 to direct airflow from the air supply component 14 over the shoulders and along the upper torso of relatively narrow-shouldered seat occupants or closer to the neck of wide seat occupants. The adjustment portions 64, 66 may alternatively or additionally be configured for translational side-to-side movement.

As shown in the side view of the seat 12 in FIG. 9, each of the adjustment portions 64 (adjustment portion 66 is not visible in FIG. 9) may be configured to rotate about a generally horizontal and transversely oriented axis and between upward and downward directions. This type of movement of the adjustment portions 64, 66 provides vertical adjustment of the airflow from the air discharge ports 42 in addition to or instead of the vertical adjustment provided by movement of the headrest 22.

For instance, the primary function of the headrest 22 requires that it is in the proper vertical location with respect to the head of the seat occupant for crash safety, which may not be the same location required to properly direct the airflow over the shoulders of the seat occupant. The adjustment portions 64, 66 may alternatively or additionally be configured for translational upward and downward movement independent of the headrest 22. In another embodiment, the entire airflow conduit 52 is configured to rotate or tilt to adjust the direction of the airflow, and separate adjustment portions 64, 66 are not required.

The movements illustrated in FIGS. 7 and 8 can also be combined with the movements illustrated in FIG. 9 such that each air discharge port 42 has at least three degrees of freedom of movement (i.e., vertical translation, rotation about a horizontal axis, and rotation about a vertical axis).

Figure 10:
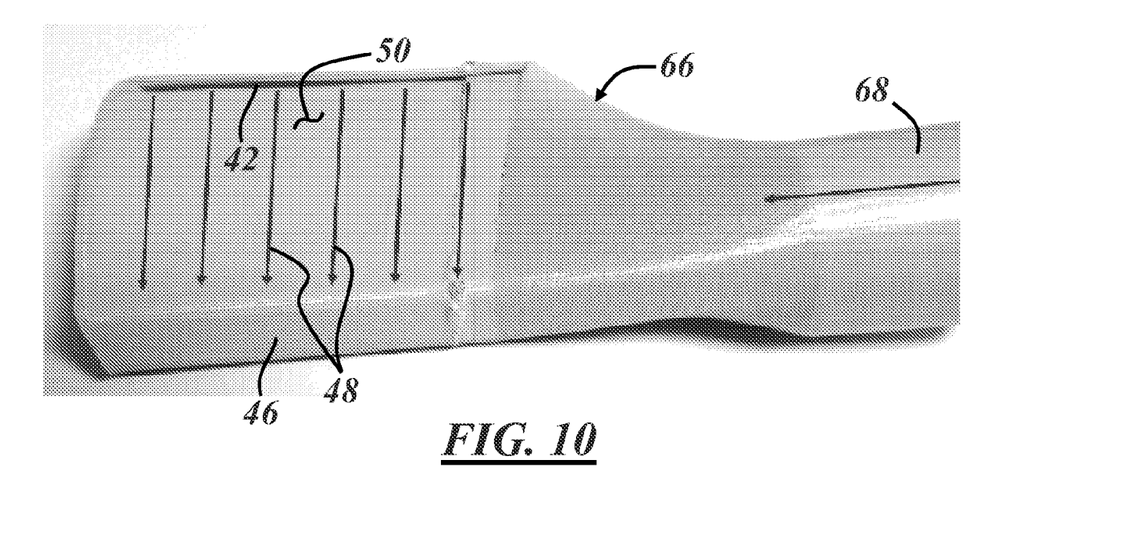
FIG. 10 is a photographic image of the bottom side of an adjustment portion of the air supply component.

FIG. 10 is a photographic image of a working example of one of the adjustment portions 66 of the air supply component 14. The image is a bottom view of the adjustment portion 66, showing the air discharge port 42 as a transversely elongated slot located away from the front edge 46 and configured to discharge air over the external surface 50 to develop the initial thin stream of conditioned air 48 as described above. This elongated and relatively thin configuration of the air discharge port 42 causes the air to be discharged with an airflow profile already very close to the desired thin stream of air.

While the Coandă effect may be achieved in some limited form by directing any airflow toward a solid surface, a discharged airflow profile significantly larger in cross-sectional area than the desired profile results in most of the air flowing away from the surface, with only the air closest to the surface being attracted to the surface to form the thin layer of interest. The elongated slot configuration of the illustrated air discharge port 42 thus makes efficient use of the conditioned air. In one example, the slot opening may be about 3 millimeters which is suitable to achieve the initial thin stream of conditioned air 26 along the exterior surface 50, though the size of the slot may be greater or less than 3 millimeters. Thin spacer ribs may be provided along the length of the elongated air discharge port 42 to maintain a consistent slot opening.

The particularly illustrated adjustment portion 66 is configured for the left-hand side of the seat. A conduit end 68 of the adjustment portion 66 is adapted for attachment to the airflow conduit 52 of the above-described air supply component 14. The illustrated conduit end 68 has a tubular shape, which is useful to provide a rotatable coupling with the airflow conduit 52 for adjustment of the airflow similar to that shown in FIG. 9.

The air discharge port 42 may alternatively be located along an opposite top side of the air supply component 14. But a bottom-located air discharge port 42 may be preferred to help prevent debris from falling inside the air supply component 14 and may also be more aesthetically pleasing (i.e., hidden from view).

Figure 11:
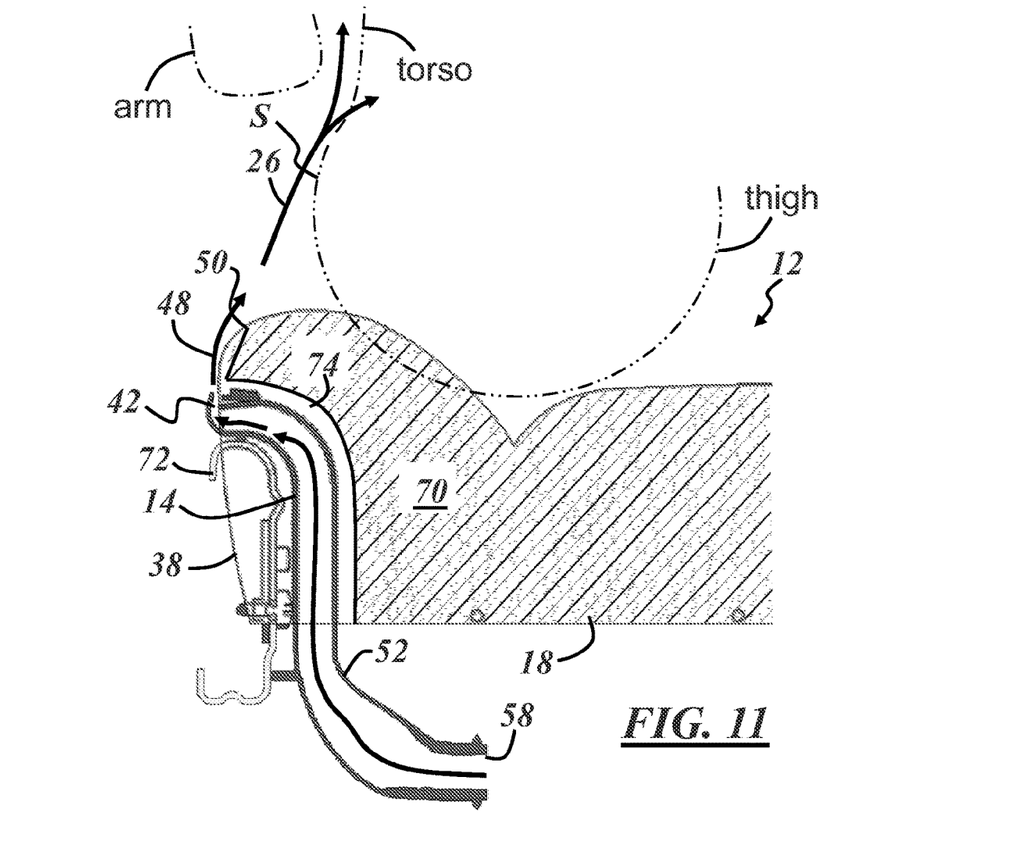
FIG. 11 is a cross-sectional view of a vehicle seat with the air supply component located in a seat bottom.
Figure 12:
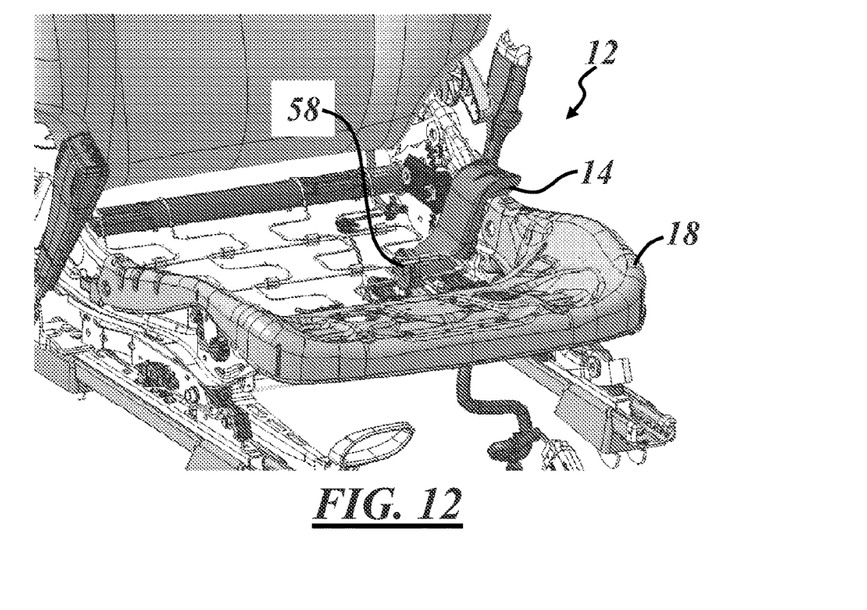
FIG. 12 is perspective view of the seat bottom with a cushion omitted, illustrating the air supply component located in the seat bottom.

FIGS. 11 and 12 depict another embodiment where the air discharge port 42 is located along the side portion 38 of the seat bottom 18 and configured such that the thin stream of conditioned air 26 follows, firstly, the contour of the seat surface and, then, the contour of the body surface S of the seat occupant. This allows for hard ducting to end and soft or hard external surfaces of the seat or the body surface S of the seat occupant to continue to direct the thin stream of conditioned air 26 after exiting the hard ducting. FIG. 11 is a cross-sectional view of the seat bottom 18 taken through the air supply component 14, and FIG. 12 is a front perspective view of the seat 12 with a foam cushion 70 omitted from the seat bottom 18.

In this example, the air supply component 14 is mounted to a frame member 72 of the seat bottom 18, and the body surface S is a thigh or leg surface of the seat occupant. The airflow conduit 52 and air intake port 58 are also indicated in FIGS. 11 and 12.

As shown in FIG. 11, the seat occupant thermal comfort system 10 can be adapted for use with traditional seat constructions including foam cushions 70 by providing a localized hollow or cutaway portion 74 in the foam cushion 70 to accommodate the air supply component 14. In other embodiments, the hollow portion 74 of the foam cushion 70 functions as the airflow conduit 52, and the air supply component 14 provides the discharge port 42, which is shaped and configured to provide the thin stream of conditioned air 26. In the illustrated embodiment, the initial thin stream of conditioned air 48 is developed along the external surface 50' of the seat cushion 18, similar to the embodiment shown in FIG. 3.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above.

Various other embodiments and various changes and modifications to the disclosed embodiment(s) will become apparent to those skilled in the art. Particularly, unless otherwise explicitly mentioned, all above described features, alternatives and/or embodiments of the present invention can be combined with each other as far as they are not incompatible or mutually exclusive of others. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. The air supply component adapted for attachment to a seat, the air supply component comprising:
   an airflow conduit adapted for fluid communication with a pressurized air source; and
   an air discharge port in fluid communication with the airflow conduit,
   wherein the air discharge port is configured to be moveable to change a direction in which air is discharged from the air discharge port when the air supply component is attached to the seat with the airflow conduit in fluid communication with the pressurized air source,
   wherein the air discharge port is located away from a front edge of the air supply component and is configured to direct airflow over an external surface of the air supply component, and
   wherein the external surface of the air supply component has a curvature that changes the direction of the airflow from an initial direction of discharge from the air discharge port.

2. The air supply component as defined in claim 1, wherein the airflow conduit is constructed to extend transversely away from a center of the seat when attached to the seat, and the air discharge port is spaced transversely away from the center of the seat.

3. The air supply component as defined in claim 1, further comprising a central air discharge port in fluid communication with the airflow conduit and configured to discharge the air.

4. The air supply component as defined in claim 1, further comprising a second air discharge port, wherein the airflow conduit is constructed to extend transversely between first and second ends along an upper portion of the seat when attached to the seat, the air discharge port being located at the first end of the airflow conduit, and the second discharge port being located at the second end of the airflow conduit.

5. The air supply component as defined in claim 1, further comprising an adjustment portion moveably coupled with the airflow conduit and in fluid communication with the airflow conduit, wherein the air discharge port is formed in the adjustment portion so that movement of the adjustment portion changes the direction in which air is discharged from the air discharge port between upward and downward directions, between opposite side-to-side directions, or both.

6. The air supply component as defined in claim 1, wherein the air supply component is adapted for attachment to an adjustable headrest of the seat so that the air supply component moves together with the adjustable headrest.

7. The air supply component as defined in claim 1, wherein the air discharge port comprises an elongated slot that discharges a jet of air over the external surface.

8. A seat comprising the air supply component of claim 1, the seat further comprising:
   a seat bottom; and
   a backrest coupled with the seat bottom and extending away from the seat bottom to an upper portion,
   wherein the air supply component is attached to the upper portion of the seat and located so that the air discharged from the air supply component can be directed along shoulders and/or a neck of a seat occupant.

9. A vehicle seat comprising the seat of claim 8, further comprising a base supporting the seat bottom, the base being adapted for attachment to a vehicle body.

10. A thermal comfort system comprising the seat of claim 8, the thermal comfort system further comprising:
   the pressurized air source in fluid communication with the air discharge port;
   a heat exchanger located and arranged to heat and/or cool the air from the pressurized air source; and
   a controller adapted to receive a user input and to control the pressurized air source and/or the heat exchanger in response to the user input.

* * * * *